E. & T. ERICKSON.
ROTARY ENGINE.
APPLICATION FILED SEPT. 12, 1910.
1,020,271.
Patented Mar. 12, 1912.
9 SHEETS—SHEET 1.
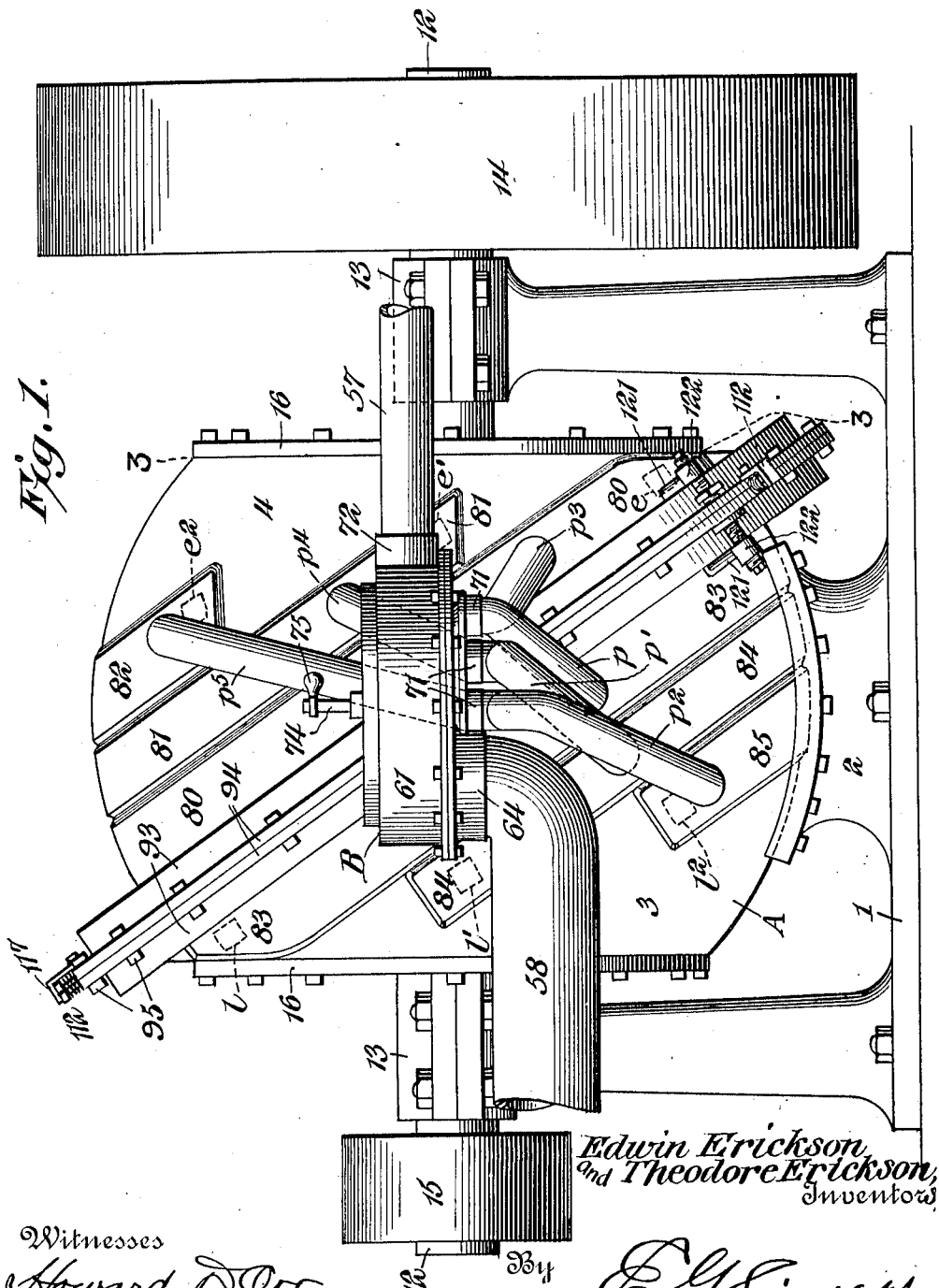
Witnesses
Howard N. Orr.
C. Bradway
Edwin Erickson
and Theodore Erickson,
Inventors
By E. G. Siggers
Attorney

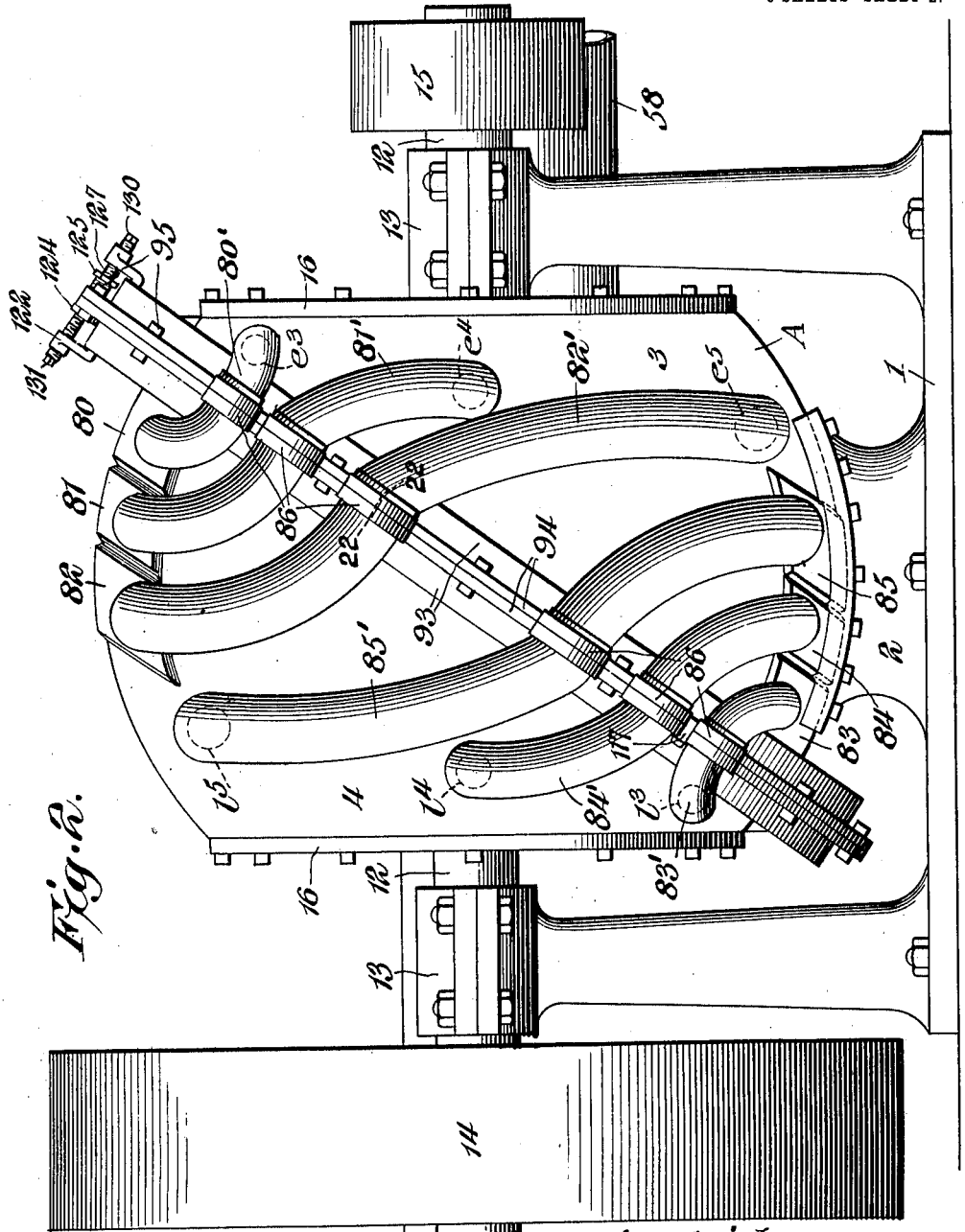

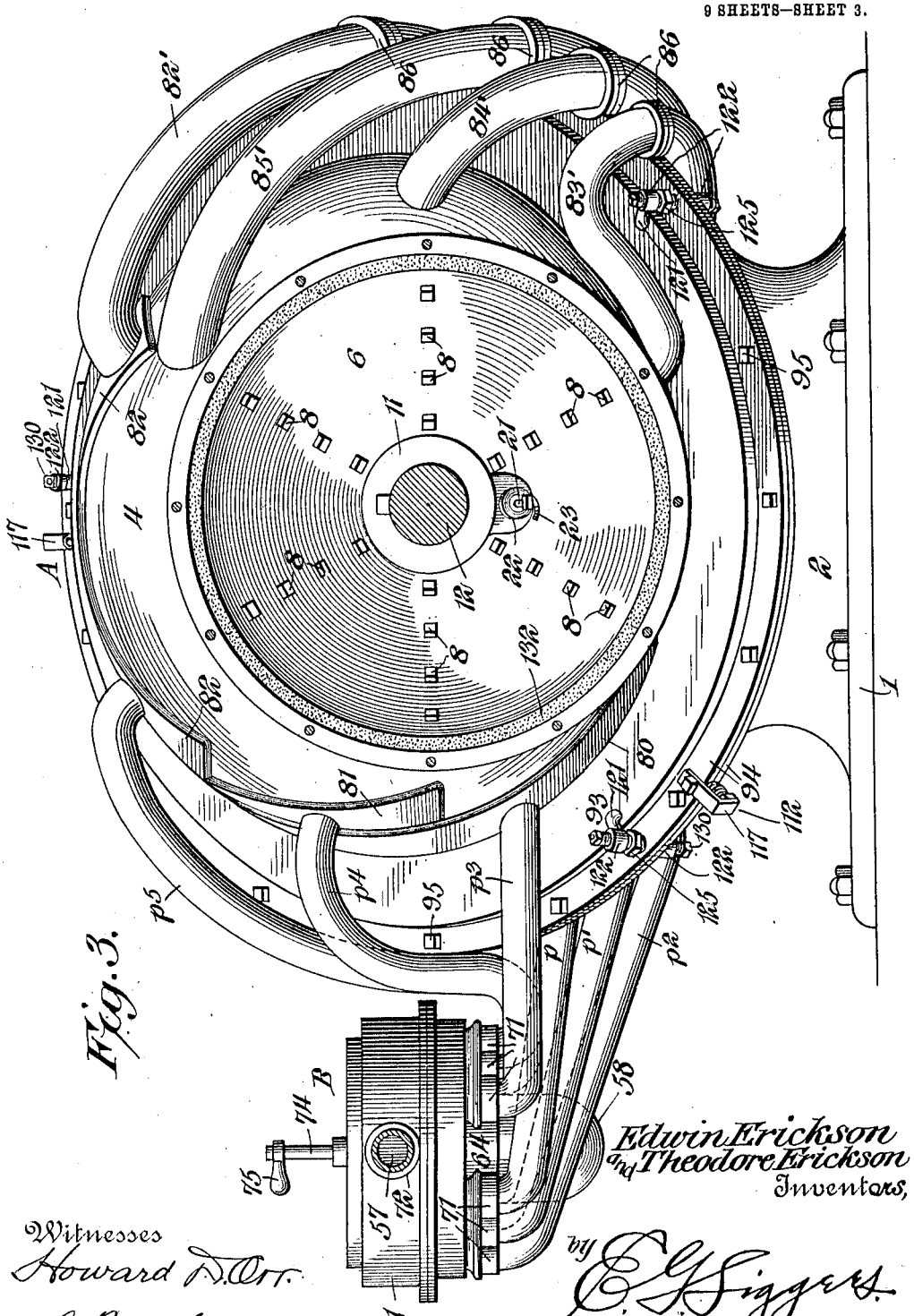

E. & T. ERICKSON.
ROTARY ENGINE.
APPLICATION FILED SEPT. 12, 1910.
1,020,271.
Patented Mar. 12, 1912.
9 SHEETS—SHEET 4.
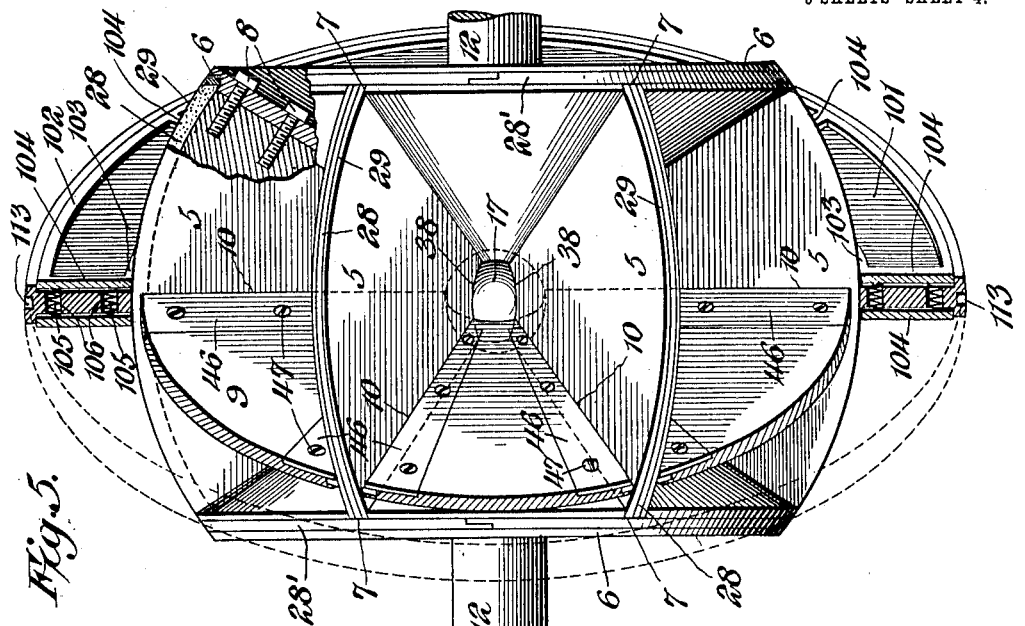
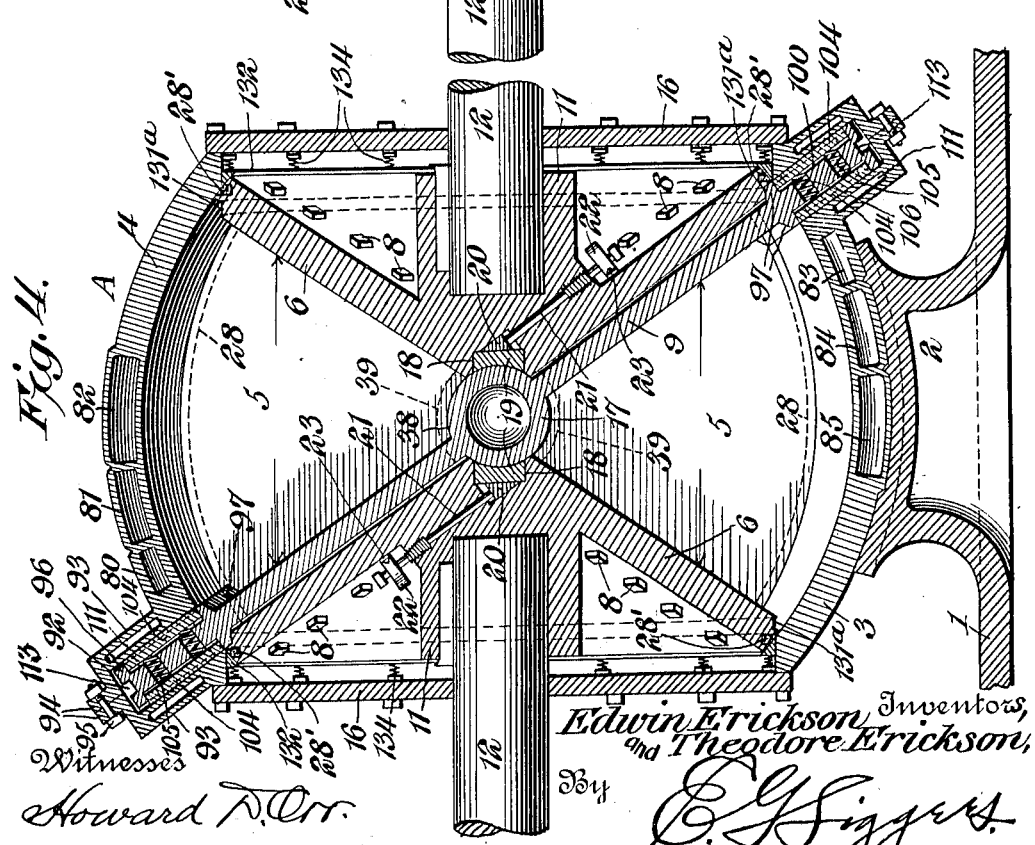

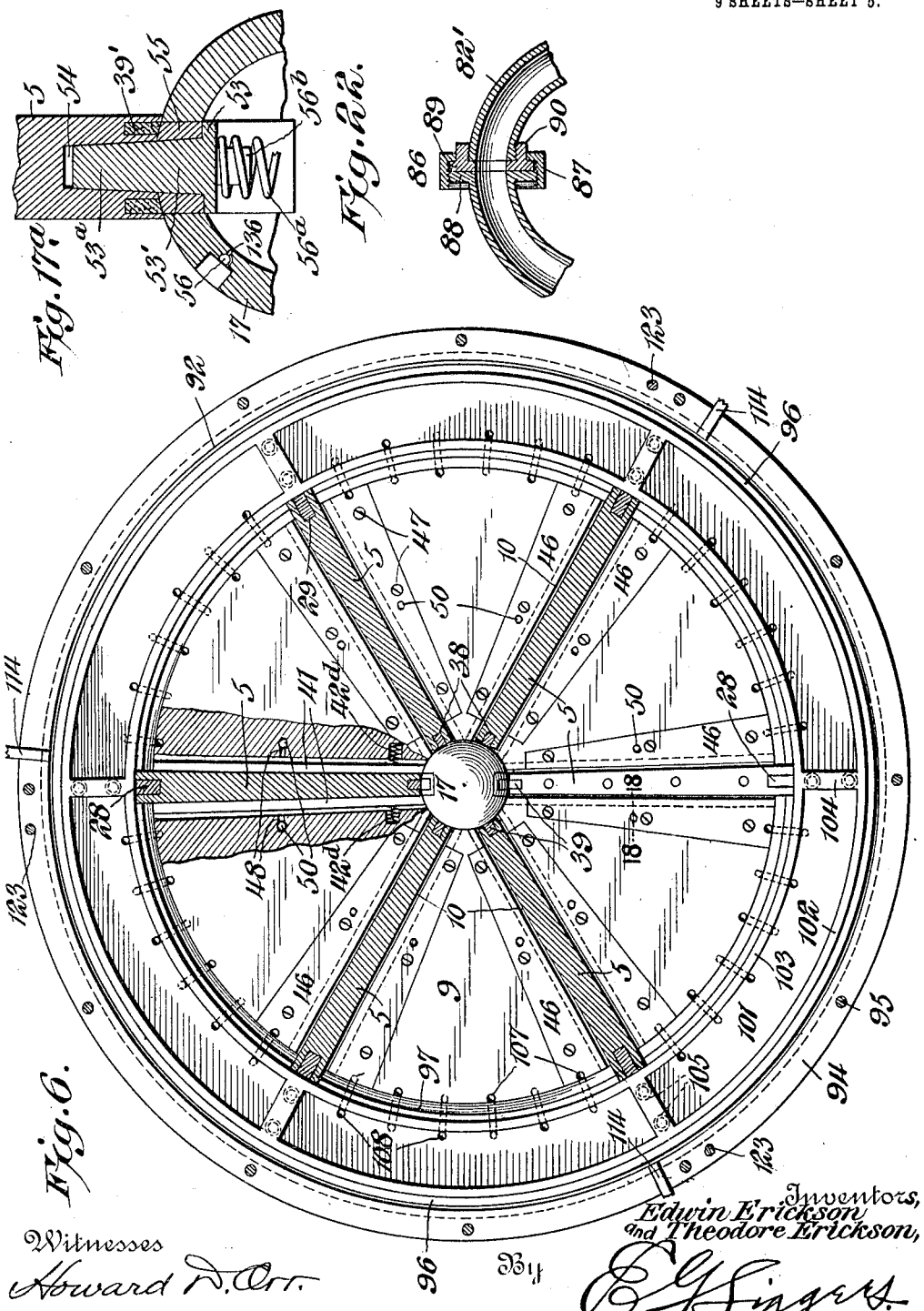

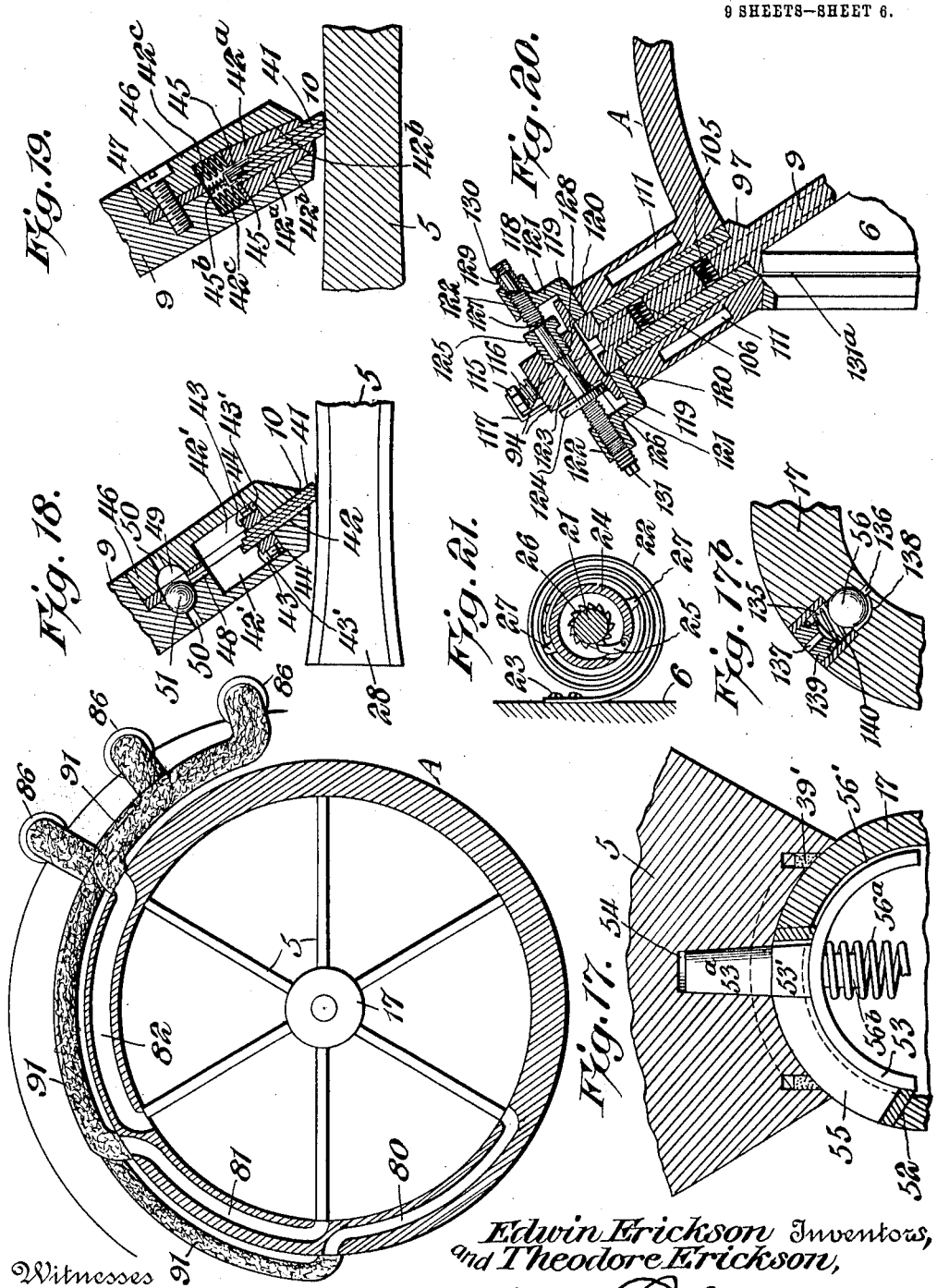

E. & T. ERICKSON.
ROTARY ENGINE.
APPLICATION FILED SEPT. 12, 1910.
1,020,271.
Patented Mar. 12, 1912.
9 SHEETS—SHEET 7.
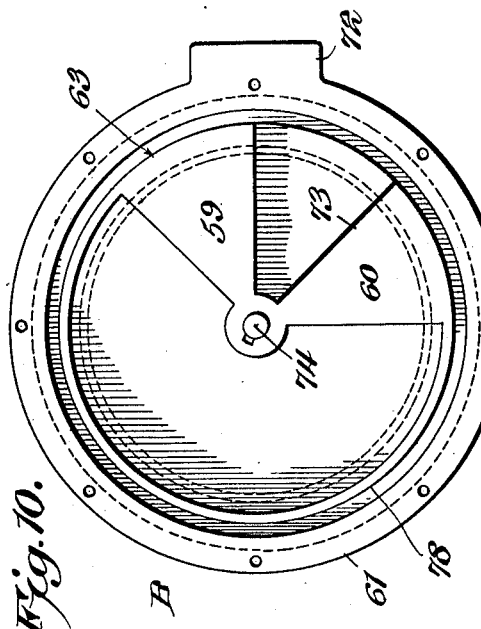
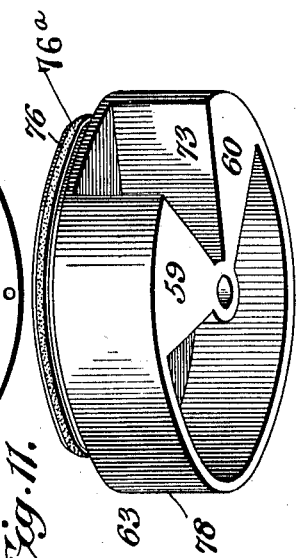
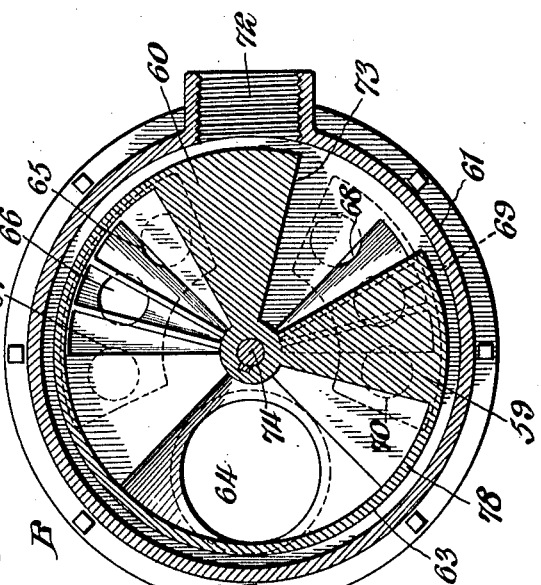
Witnesses
Howard D. Orr.
C. Bradway.
Edwin Erickson
and Theodore Erickson,
Inventors,
By
Attorney E. & T. ERICKSON.
ROTARY ENGINE.
APPLICATION FILED SEPT. 12, 1910.
1,020,271.
Patented Mar. 12, 1912.
9 SHEETS—SHEET 8.
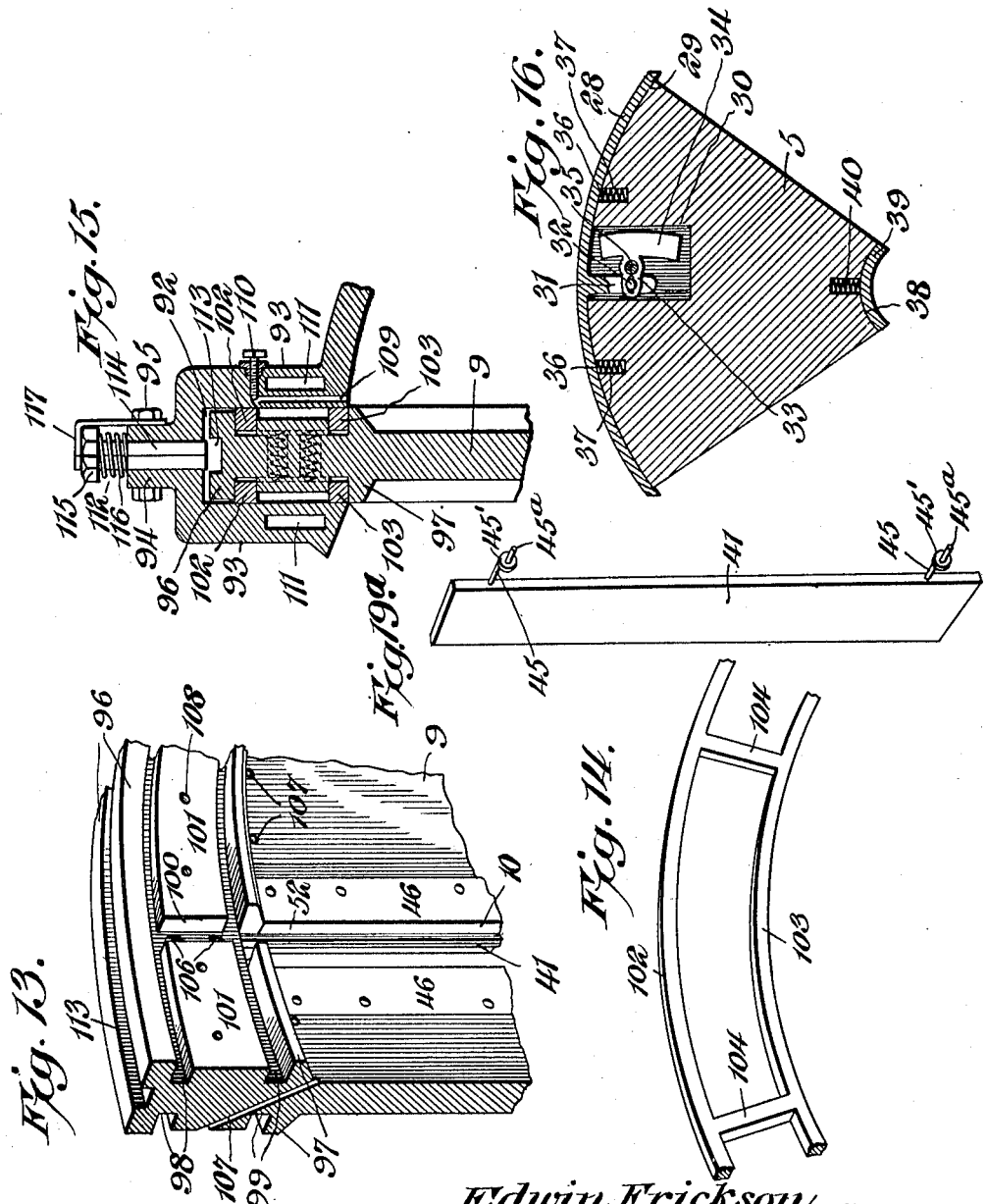

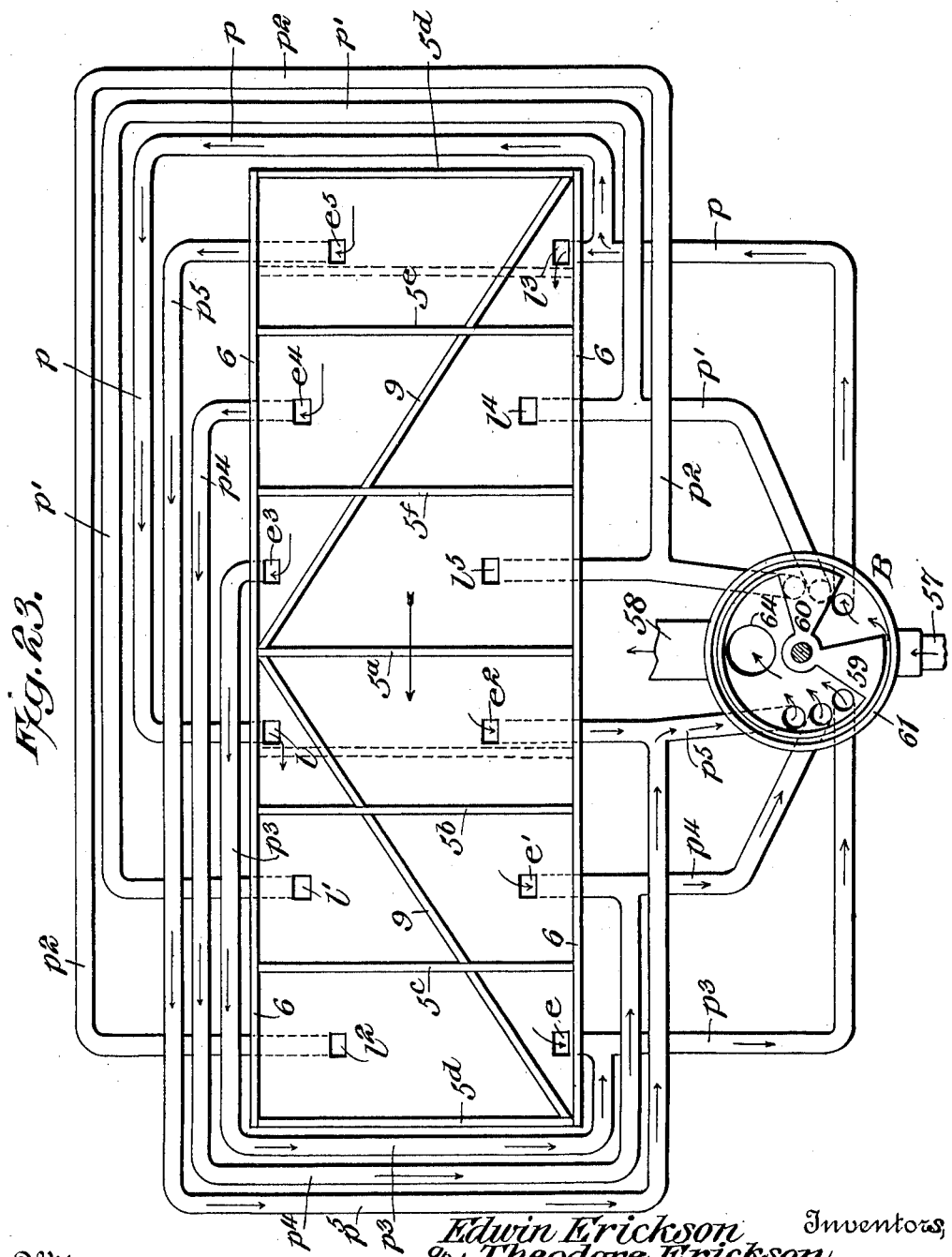

UNITED STATES PATENT OFFICE.

EDWIN ERICKSON, OF NEAR CHANCELLOR, SOUTH DAKOTA, AND THEODORE ERICKSON, OF JUDITH GAP, MONTANA.

ROTARY ENGINE.

1,020,271.  Specification of Letters Patent.  Patented Mar. 12, 1912.

Application filed September 12, 1910. Serial No. 581,553.

*To all whom it may concern:*

Be it known that we, EDWIN ERICKSON and THEODORE ERICKSON, citizens of the United States, residing, respectively, near Chancellor and at Judith Gap, in the counties of Turner and Meagher and States of South Dakota and Montana, have invented a new and useful Rotary Engine, of which the following is a specification.

This invention relates to rotary engines of that type comprising a casing and a rotatable element within the casing, which element consists of a plurality of radially-disposed blades connected with oppositely-disposed frusto-conical heads that close the ends of the casing, and a partition disk arranged obliquely to the axis of rotation and having radial slots through which the blades pass laterally back and forth during the rotation of the element to provide on each side of the disk separate sets of compartments or chambers between the blades, in connection with means for supplying steam or other motive fluid into those chambers that successively expand from zero to maximum cubical contents during one half of a revolution, and for exhausting the motive fluid from the same chambers as they change from maximum to minimum cubical contents, the blades inclosing each chamber being of different areas whereby the steam acts on the blade of larger area to turn the rotary element of the motor.

The invention has for one of its objects to improve and simplify the construction and operation of engines of this character so as to be comparatively simple and inexpensive to manufacture and keep in repair, economical in the consumption of motive fluid, capable of developing great power for its size and weight, and readily controlled to use live steam at full pressure through the range of operation or through a portion thereof so as to act expansively on the blades, the arrangement of the inlet and exhaust ports being such that a single valve may be employed for rendering the engine reversible by directing the live steam through one set of ports while the other set is used for exhausting.

Another object of the invention is to so design, arrange and balance the parts that friction and wear are reduced to a minimum, and by the employment of automatically and constantly operated compensating means, the parts that are subject to wear can be kept fluid-tight and thus maintained at their maximum efficiency.

Another object is the provision of a centering means serving to hold the blade-driven disk or partition plate in its oblique plane of rotation so that excessive wear on one side or the other of the casing or disk will be prevented, there being an indicator arranged permanently on the casing, whereby the position of the disk may be ascertained at any time without disassembling the engine, to thus enable the attendant to accurately adjust the disk through the centering means.

An additional object is to provide a novel means for counterbalancing the lateral pressure on the blade-driven disk, due to the live steam acting thereon by utilizing the steam pressure in a simple and effective manner in a counterpressure chamber, in which the peripheral portion of the disk rotates, there being packing rings on the opposite sides of the marginal portion of the disk which provide compartments into which fluid under pressure may be admitted to effectively oppose the pressure of the live steam utilized in rotating the movable element of the motor.

The invention has as a further object, a novel arrangement for supporting the blade-driven disk in such a manner that leakage will be prevented and the disk will be maintained in its original position so that wear between the casing and blades will be uniform at all points.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a front view of the engine. Fig. 2 is a rear view thereof. Fig. 3 is a transverse section taken on line 3—3, Fig. 1. Fig. 4 is a vertical longitudinal section taken on an irregular line passing through the body of the casing between two blades and through the counterpressure chamber in the plane of a blade. Fig. 5 is a front view of the rotatable structure of the motor, portions being broken away and portions being shown in section. Fig. 6 is a transverse section taken on a plane parallel with the disk, and in the plane of division of the two parts of the casing, certain of the blades being shown in section. Fig. 7 is a more or less diagrammatic view of a modification, showing a transverse section of the engine with one set of admission ports. Fig. 8 is a central vertical section of the fluid controlling device, the valve thereof being in elevation. Fig. 9 is a horizontal section on line 9—9, Fig. 8. Fig. 10 is a bottom plan view of the valve and casing, the bottom plate of the casing being removed. Fig. 11 is a perspective view of the valve. Fig. 12 is a detail section of one set of ports in the bottom plate of the valve casing. Fig. 13 is a fragmentary perspective view of a portion of the blade-driven disk. Fig. 14 is a fragmentary perspective view of one of the packing rings for the peripheral portion of the disk disposed in the counterpressure chamber. Fig. 15 is a transverse section of the counterpressure chamber and peripheral portion of the disk, showing the means for draining off the water of condensation from the chamber and the means for indicating the position of the disk. Fig. 16 is a detail view of one of the blades, showing the packing strips for the inner and outer edges thereof, together with the means for opposing the centrifugal and gravitational forces acting on the outer packing strip. Fig. 17 is a sectional view showing the driving engagement between a blade and the disk. Fig. 17$^a$ is a detail sectional view taken at a right angle to Fig. 17. Fig. 17$^b$ is a detail section of the valve in the hub. Fig. 18 is a section on line 18—18, Fig. 6, with the blade in elevation. Fig. 19 is a similar view showing a modification. Fig. 19$^a$ is a perspective view of one of the packing strips. Fig. 20 is a transverse section of the counterpressure chamber taken therethrough at one of the disk centering means. Fig. 21 is a sectional view of the self-adjusting means for the disk-supporting or bearing blocks. Fig. 22 is a detail section on line 22—22, Fig. 2, showing one of the joints in the steam pipes. Fig. 23 is a diagram of the supply and exhaust conduits, together with a development of the blades and rotary disk of the engine for showing the system of inlet and exhaust ports.

Similar reference characters are employed to designate corresponding parts throughout the views.

Referring to the drawings, and more particularly to Figs. 1 and 2, 1 designates the bed of the engine which has a central pedestal 2 that carries the casing A of the engine, which is of a hollow spherical construction cut off transversely at its ends. The casing is made in two parts 3 and 4, divisible on a plane disposed obliquely to the horizontal axis. The rotatable part of the engine comprises a plurality of blades 5 of sector form with their flat faces parallel one to the other, said blades extending radially with respect to and in the direction of the length of the axis of rotation and connected with the blades are oppositely-arranged conical ends walls or heads 6 which have radial slots 7 for receiving the side edges of the blades, the blades and heads being secured together by bolts 8 passing through the heads and screwing into the side edges of the blades, as shown clearly in Fig. 5.

Arranged within the casing is a division plate or disk 9 which is coincident with the plane of division of the two parts of the casing; that is to say, obliquely to the axis of rotation, so that as the disk rotates with the blades, the latter will pass back and forth through the disk which is provided with radial slots 10 for accommodating the blades. In the present instance, six blades are shown arranged in diametrically opposite pairs and sixty degrees apart.

The chambers between adjacent blades are divided by the obliquely arranged disk 9 into separate live and dead steam compartments, and the blades of each live steam compartment are of different areas so that the steam acting on the blade of larger area will turn the rotating element of the engine. At diametrically opposite points, the disk 9 has its opposite sides approximately in contact with the heads or end walls 6, as shown in Figs. 4 and 5, and from these points the live steam chambers uniformly increase in size during one-half revolution while the same chambers uniformly decrease in size during the second half revolution, when they become exhaust or dead steam chambers. By the particular arrangement shown, there will be three live steam compartments continuously in operation on the front left half of the disk and three additional live steam compartments disposed diametrically opposite to the other at the rear right half of the disk so that all the blades are practically active during the entire revolution, whereby a powerful torque is produced. The heads or end walls 6 are formed with hubs 11, Fig. 4, in which are keyed axially alined axles 12 that are journaled in bearings 13 rising from the bed 1 of the engine, and on these axles may be arranged a fly wheel 14 and pulley 15, respectively. The casing may be closed by end plates 16 which inclose the reëntrant spaces in the heads 6 to conserve the heat.

The blade-driven disk 9 is mounted in such a manner that it will maintain its original central position and leakage, through wear, will be prevented. For this purpose, the disk is provided with a spherical hub 17 which is coincident with the axis of rotation and projects equally from the opposite flat faces of the disk. The conical heads 6 are provided with reëntrant chambers 18 at their oppositely disposed apexes for receiving bearing blocks 19 that are concave on the same radius as the spherical hub to fit the latter at diametrically opposite points in the axis of rotation. These bearing blocks are mounted for rotation in their respective chambers or seats so that they will wear uniformly and always fit the spherical hub. The bearing blocks are constantly urged inwardly toward each other under a pressure that will support the disk against its own weight. This result is accomplished by the use of wedges 20 disposed between the blocks and the bottoms of the chambers, and threaded rods 21 mounted in the hubs of the heads 6 to exert a continuous pressure on the wedges. Each screw rod is equipped with a spring 22 which exerts a tension to turn the rod in a direction for moving it longitudinally toward the wedge. The outer end of the spring, as shown in Figs. 4 and 21, is fastened at 23 to the head 6 and the inner end is connected with a collar 24 which carries a pawl 25 to engage with a ratchet wheel 26, whereby the spring can be tensioned by a spanner engaging the lugs 27 of the sleeve. Since the wedges are constantly urged in a direction to press the bearing blocks into engagement with the bearing ball or spherical hub 17, the wear of the parts will be compensated to thus maintain the disk 9 in its original position. As a result of this arrangement, the weight of the disk is not thrown upon the upper edges of the uppermost blades, as would otherwise occur, and wear of the grooved edges of the same and the packing strips therein is, therefore, avoided.

The bore of the casing is carefully finished and the outer edges of the blades are curved to correspond therewith, and extending longitudinally of the outer edge of each blade is a curved packing strip 28 set in a groove 29, whereby the leakage of steam from one compartment to another is prevented, similar packing strips 28' being provided in the edges of the heads. These packing strips are urged outwardly under the combined action of gravity and centrifugal force, so that excessive friction and wear of the casing strips would be produced, and to overcome this each strip has a counterpoise, as shown in Fig. 16. The packing strips 28 will, in time, wear a slight groove across the outer end of the slot in the disk. If the strip were straight with parallel sides, the changing angular relations between the disk and the blade would cause the strip to wear a groove wider than itself which it would not fill or bridge at most of the relative positions of the blade and disk. Leakage would then occur along the strips at the outer ends of the slots from one side of the disk to the other side thereof, but by employing a concave strip this leakage is prevented. Each blade 5 has at its outer end a chamber 30 into which extends a finger 31 on the packing strip 28 that is connected by a slot and pin joint 32 with the arm 33 of the counterpoise 34 which is fulcrumed at 35. The counterpoise is so weighted with respect to the packing ring that the action of gravity and centrifugal force on the counterpoise will balance the action of the same forces on the packing strip. The packing strip is urged outwardly into contact with the bore of the casing by springs 36 disposed equidistant from the middle of the strip and set in chambers 37 in the bottom of the packing-receiving groove 29. The inner end of each blade is cut away to form a concave seat 38 for fitting the spherical hub of the blade-driven disk 9, and in this seat is contained an arcuate packing strip 39 that is pressed into engagement with the spherical hub or ball 17 by a spring 40 arranged behind the packing strip.

The blade-driven disk is provided with packings at its radial slots 10 so as to prevent leakage along the blades from the live steam compartments to the exhaust or dead steam compartments. The construction of this packing is disclosed in Figs. 18 and 19, and consists of a plurality of laminæ or strips 41 arranged flat against each other and set in a chamber 42 extending longitudinally in each wall of the slots 10 for the blades. The outer edges of the strips 41 are rounded or convex so as to make contact with the blade in all the angular relations of the disk with the blade, it being understood that the disk, in each revolution, changes from right-angular position at the end of the blade to an oblique position at the middle of the blade. The packing strips are all urged outwardly in any suitable manner as, for instance, in the manner hereinafter described so that each has a line contact with the blade, which latter has its opposite faces concaved so that in and out sliding movement of the packing strips as the blades pass through the disk, will be minimized. In order to permit the blade packings to be readily assembled, one side of the chamber 42 is formed by a removable plate 46 held in place by countersunk screws 47. A convenient means for urging the packing strips 41 into engagement with the blades is shown in Fig. 18, whereby fluid pressure from the live steam compartments may be admitted to the packing chambers 42. Each chamber 42 communicates through a port 48 with a valve chamber 49 which communicates through ports 50 with the live steam compartment at either side of the disk. In the valve chamber 49 is a ball valve 51 which moves from one end of the valve chamber to the other for closing either port 50. When the live steam compartment is on the right side of the disk 9, Fig. 18, the ball valve will be in position to close the left port 50 which communicates with the exhaust or dead steam compartment, and while the ball is in this position, the port 48 is in communication with the right port 50 so that live steam can enter the packing chamber and force the packing strips outwardly. After the disk makes a half turn, the ball valve will move to the other end of the valve chamber to connect the left port 50 with the port 48 to admit live steam to the packing chamber from the live steam compartment, which is now on the left side of the partition disk 9. It will thus be seen that the packing will be held by steam pressure against its blade.

The inner ends of the strips 41 lie normally within enlargements 42′ of the packing chambers and within said enlargement follower strips 43 are arranged around the ends of the packing strips, said follower strips fitting closely against the sides of the packing strips and being equal thereto in length although obviously of less width. A small space 43′ is left between the follower strips and the walls of the enlargement which will receive part of the steam admitted through the port 48 so that the pressure of the same will not only hold the packing strips against the blade but will also hold the strips 43 against the packing strips, thereby compensating for wear and keeping all the parts fluid tight. Leaf springs 44 are arranged between the follower or wear strips and the walls of the chamber containing the same so as to prevent the wear strips dropping away from the packing strips when there is no fluid pressure in the packing chamber. We thus avoid the liability of the steam, when again admitted, entering between the packing strips and the wear or follower-strips and forcing the latter against the walls of the chamber and thereby preventing the proper operation of the parts.

Where steam is not admitted to the packing chamber, springs may be used to hold the packing strips to the blades. In this instance, a pin 45 will be fitted to each end of each packing strip and each pin will be provided with an enlarged head 45′ on which will be provided a spur 45ª. A spring 45ᵇ will be coiled around this spur between the head 45′ and the outer wall of the packing chamber to hold the packing strip outward and the construction just described permits the use of a spring wider than the individual strip. To compensate for wear, wedges 42ª are placed against the packing strips between the same and beveled surfaces 42ᵇ of the packing chamber and these wedges are pressed outward by springs 42ᶜ arranged between the inner ends of the same and the inner wall of the chamber.

The outer ends of the packing strips have a greater travel across the face of the blade than the inner ends thereof and, consequently, are subject to more wear. To equalize the wear, a spring 42ᵈ, see Fig. 6, may be provided to press upon the inner end of each packing strip in addition to the fluid pressure thereon and thus increase the pressure at the inner end of the strip over that at the outer end thereof in an amount sufficient to equalize the wear on the strip.

The blades 5 serve to drive the disk 9 and hence a rigid driving connection between the blades and disk must be provided. The blades cannot drive the disk through the packing strips 41, since the latter are yielding and the blades would work back and forth in the slots of the disk whereby vibration or knocking would be produced. The rigid driving connection between the blades and disk is afforded by the means shown in Fig. 17, in which the ball hub 17 is shown as provided with a slot 52 arranged transversely to the disk and registering with one of the slots in the disk through which the blade passes. A packing member 53, in the form of a segmental plate, is arranged within the hub 17 and carries a block 53′ from which a pin 53ª projects to engage a recess or socket 54 in the inner end of the blade. After the plate 53 has been inserted through the slot 52, a bushing 55 is fitted over the block 53′ so as to properly space said plate and the blade and serve as a lining for the slot 52, it being understood that the bushing corresponds in shape to the slot. The block 53′ and pin 53ª are tapered and the socket 54 is frustoconical so as to facilitate the adjustment of the parts to compensate for wear. For the same reason, the inner walls of the bushing 55 converge outwardly so as to engage the sides of the block 53′ at all times. The plate 53 is constantly urged outward against the inner edges of the bushing and the outward pressure will be transmitted to the block and pin so that they will automatically take up the wear and maintain snug and fluid-tight joints with their respective seats.

We prefer to employ fluid pressure to urge the connection outwardly and, to this end, provide a valve 56 in the hub 17 to one side of the slot therein whereby steam may be admitted to the interior of the hub. It will be readily noted on reference to Fig. 17 that the packing plate is longer than the slot in the hub so as to cover the slot in all positions of the blade. Consequently, the area exposed to steam pressure within the hub is greater than that exposed to pressure through the slot and the plate will be held to its seat. The height of the bushing is somewhat greater than the thickness of the hub and the end of the plate 53 will, therefore, be spaced slightly from the inner wall of the hub, providing a space 56' in which steam will enter to balance the ends of the plate as they travel over the bushing and thereby relieve the plate of undue pressure and friction. The devices are duplicated at diametrically opposite points, thus producing a balanced torque on the disk, and a spring $56^a$ is arranged between the diametrically opposite plates with its ends engaging teats $56^b$ on the inner sides of the plates so that the plates will be held to their seats when the engine is idle or when no fluid pressure is admitted to the hub. The valve 56 is located in a chamber 135 formed in the hub and having a port 136 leading to the interior of the hub and a port 137 leading to the space between two blades. A groove 138 is formed in the inner valve seat so that the valve can not completely close the inner port 136 and, consequently, steam must be admitted to the hub whenever it is in the space between the blades, but when the steam is exhausted from the chamber between the blades the pressure within the hub will force the valve to close the port 137 which is formed in a plug 139 secured in the outer end of the chamber 135. A spring 140 is arranged between this plug and the valve and bears on the valve to lift the same when the engine comes to rest with the valve in a low position. As the steam in the hub condenses, the pressure on the valve will be reduced and the spring then lifts the valve so that the water of condensation will drain from the hub.

A packing strip 39' will be provided in the inner end of the blade which is connected with the hub.

By the arrangement of the various packings described, the compartments between adjacent blades are effectively separated from each other and the live and dead steam compartments between each pair of blades and at the opposite sides of the blade-driven disk are separated from each other, whereby steam economy and efficient operation are obtained. The system of conduits for admitting and exhausting steam to and from the live and dead steam compartments is so designed that a single valve may be employed for utilizing steam at full pressure, or expansively. In describing the means for admitting and exhausting motive fluid, reference is to be had to Fig. 23, which is a development of the rotatable part of the motor, namely, the blades 5, heads 6, and partition disk 9, in conection with the diagram of the fluid conduits.

In the casing are arranged ports for the admission and exhaust of steam, and these ports correspond in number to the live and dead steam compartments. Each set of ports admits steam to the compartments at one half of the disk, and they will, preferably, be arranged at an angle to the blades so that the velocity with which the steam strikes the blade will be utilized in addition to the expansive force of the fluid, to propel the engine. The live steam ports $l$, $l'$, $l^2$, admit steam to the compartments at the front left half of the disk while the live steam ports $l^3$, $l^4$, $l^5$, admit live steam to the compartments at the right rear half of the disk, and the set of exhaust ports $e$, $e'$, $e^2$, permit the steam to pass out from the compartments at the front right half of the disk, while the ports $e^3$, $e^4$, $e^5$, permit the steam to pass out from the compartments at the left rear half of the disk. The ports of each set are spaced apart approximately the same distance as the outer edges of the blades so that the steam entering between any two blades will be cut off by the following blade or the blade of smaller area, so that the steam will act on the leading blade, which is of larger area, and cause the rotary part of the engine to rotate. The live steam can be admitted simultaneously through both ports $l$ and $l^3$ at diametrically opposite points and at opposite sides of the disk, and this steam will act expansively after the following blades pass the inlet ports during one third of a revolution, assuming that the ports $l'$, $l^2$, and $l^4$, $l^5$, of the other set are closed. That is to say, when the blades $5^a$, $5^d$, reach the dotted line positions, the steam will enter the compartments behind the said blades and act on the latter to rotate the parts in a direction indicated by the arrow, and this steam will continue to fill the said compartments as the latter grow larger and larger during one sixth of a revolution, until the following blades $5^f$, $5^c$, reach the dotted line position, when the steam will be cut off from the said compartments to allow the steam therein to act expansively as the leading blades expose more and more surface, until the maximum point is reached, after which the exhaust takes place, the compartments changing at this point from live to dead steam compartments. The range during which the steam acts expansively may be shortened by also admitting steam through the ports $l'$, $l^4$, by means hereinafter described, so that live steam will be admitted during approximately one third of a revolution and expansion will take place during approximately one sixth of a revolution. Again, steam may be admitted through the ports $l^2$, $l^5$, in addition to the other admission ports, by means hereinafter described, so that the steam will act non-expansively or at maximum pressure on each blade during each half revolution.

The exhaust ports are so disposed that the steam compartments may be connected with atmosphere or a condenser at all times as the compartments decrease from maximum to minimum size. When the live steam compartment between the blades $5^a$, $5^t$, has turned through one hundred and eighty degrees, it will have reached its maximum size and will then be brought into communication with the exhaust port $e^5$. As it turns through another sixty degrees, it will communicate with the exhaust port $e^4$, and whatever steam has failed to pass out through the exhaust port $e^5$, has a further chance to escape, and during the next sixty degrees, the same compartment will communicate with the exhaust port $e^3$. It will thus be seen that as the compartment grows smaller and smaller, the exhaust steam has ample chance to escape, so that there will be no compression and hence back pressure. It will thus be seen that as the compartments of increasing size pass successively into communication with the inlet ports, the live steam acts in such manner as to rotate the blades and connected parts while simultaneously the dead steam passes out through the exhaust ports as the compartments of decreasing size successively communicate therewith. This means that each blade is acted on by live steam twice during each revolution, and thus power is applied at twelve points, since there are six blades, with the result that a substantially uniform torque is produced. The first inlet ports $l$, $l^3$, of both sets of compartments are connected with the branched supply pipe $p$, the second inlet ports $l'$, $l^4$, with the pipe $p'$, and the third inlet ports $l^2$, $l^5$, with the pipe $p^2$.

The exhaust ports $e$ and $e^3$, are connected with a branched pipe $p^3$; the exhaust ports $e'$, $e^4$, with the pipe $p^4$; and the exhaust ports $e^2$, $e^5$, with the pipe $p^5$. These pipes are connected with a controlling valve designated generally by B, that has an inlet 57 and an outlet 58. The valve has a rotary part composed of wings 59 and 60, so arranged that all three exhaust pipes will be connected at one time with the outlet 58, while the supply pipes $p$, $p'$, $p^2$, may be connected with the inlet 57. When the wings are in the position shown in Fig. 23, steam is admitted to the inlet ports $l$, $l^3$, and the dead steam passes out through all the exhaust ports and pipes $p^3$, $p^4$, $p^5$, as indicated by the arrows. Since only one supply pipe is open, the steam acts expansively during only one third of a revolution. By turning the wings 59 and 60 in anti-clockwise direction, the supply pipe $p'$ may be opened and also the supply pipe $p^2$. Steam would thus be admitted to the first and second inlet ports or all three. By turning the wings 59 and 60, to a central position, the engine will be stopped since the supply through the inlet is cut off, and by turning the wings still farther in the same direction, the ports that were previously used for exhausting will be converted to the inlet ports, and the former inlet ports will serve for exhausting, so that the engine will be reversed. The system of supply conduits will be the same for a non-reversible engine, and all that is necessary to render such engine reversible is to provide a valve such as that described, whereby either set of pipes $p$, $p'$, $p^2$, or $p^3$, $p^4$, $p^5$, may be used for supplying or exhausting the steam.

The construction and arrangement of the controlling valve is more clearly set forth in Figs. 1 and 8 to 12, inclusive. It comprises a casing 61 that has a flat bottom plate 62 on which rests a rotary valve body 63. The bottom of the valve body is carefully finished to fit on the plate 62, which latter is provided with an exhaust port 64 and two sets of ports 65, 66, 67, and 68, 69, 70, that are connected, respectively, with the pipes $p$, $p'$—$p^2$, the bottom plate having nipples 71 for connection with the various pipes. In the side of the casing is an opening 72 into which the inlet pipe is threaded. The valve body is of circular form and of less diameter than the casing 61 so as to provide an annular chamber entirely around the valve body, which communicates through a sector-shaped opening 73 with one or more ports of either set. The ports are arranged in close proximity so that the opening 73 may be brought into register with all the ports of either group. At opposite sides of the opening 73 are the wings 59 and 60, so arranged that one set of ports may be brought into communication with the exhaust port 64, while one, two or three of the other ports are open to the inlet pipe for admitting steam. The valve body has a stem 74 that projects out of the top of the valve casing and is equipped with a handle 75, whereby the valve can be turned to admit steam through either set of ports for reversing or controlling the point of cut-off. The valve body is reduced at its upper end 76 to enter a chamber 77 formed in the top of the casing, the part 76 being provided with a packing ring $76^a$ to snugly fit in the chamber so that the pressure of the live steam will not act on the entire top surface of the valve body. The portion 78 of the valve body, projecting beyond the part 76, is, however, exposed to the steam, whereby sufficient downward pressure will be exerted on the valve body to maintain it seated without sufficient friction to render the turning of the valve difficult. To hold the valve centrally, the lower end of the stem thereof engages in a stepped bearing or socket 79 in the bottom plate of the valve casing.

As shown in Figs. 1 and 3, the controlling valve B is located at the front of the machine, and the pipes $p$—$p^5$, do not extend directly to the various ports in the casing, but preferably the latter is cast with conduits 80, 81, 82, on the section 4 of the casing A, and 83, 84, 85, on the section 3 of the casing. These conduits are in the form of belts extending partly around the respective sections of the casing, and the lower ends of the conduits 80, 81, 82, have ports $e$, $e'$, $e^2$, respectively, shown by dotted lines, while the upper ends of the conduits 83, 84, 85, have ports $l$, $l'$, $l^2$, respectively, also shown by dotted lines. These conduits extend to the rear of the casing, and the conduits 80, 81, 82, as shown in Fig. 2, communicate with the ports $e^3$, $e^4$, $e^5$, through back connecting pipes 80', 81', 82', while the conduits 83, 84, 85, are connected with the ports $l^3$, $l^4$, $l^5$, by back connections 83', 84', 85'. The back connections are each made in two parts connected by a joint 86 which is shown in detail in Fig. 22, the joints being disposed in a plane coincident with the plane of division of the casing, so that one half of the back connections will be supported on one section of the casing, and the other half of the connections with the second section of the casing. The joint shown in Fig. 22, comprises a coupling collar 87 threaded on flanges 88 and 89 of the two parts of the back connection. The flange 89 is carried by a collar 90 threaded on one half of the back connection so as to be removable to permit the collar 87 to be assembled. By coring out the conduits 80 to 85 in the wall of the casing, there is less radiation of heat from the steam than when the conduits are in the form of pipes entirely exposed at all sides.

It may be preferable, in some instances, to make the conduits as shown in Fig. 7, so that each conduit will be as long as the compartment it is intended to supply. The advantage of this arrangement is apparent when steam is used expansively after the compartments move out of communication with the inlet port, since those portions of the wall of the cylinder where the steam expands will be of lower temperature than the live steam and will thus cool the conduit through which the live steam passes to the inlet port. In other words, if the conduit 80, Fig. 7, for instance, extended half around this casing instead of the full peripheral length of the first compartment in which live steam enters during the full time it passes the inlet port, the expanding steam in those compartments which are out of communication with the inlet port, will progressively fall in temperature and cool the wall of the cylinder containing the steam supply conduit, thus materially lowering the temperature of the incoming steam and impairing the efficiency. The conduits 80, etc., for the different compartments, are of a length equal to one-sixth of the periphery of the casing, and each is provided with a pipe 91 which stands out from the casing and is covered with asbestos so as to prevent loss of heat by radiation.

The action of the live steam in each compartment is such that a lateral pressure is exerted on the blade-driven disk and opposed end wall, as well as the leading and following blades. That is to say, the lateral pressure is exerted on the disk toward the left and right at the top and bottom, as indicated by the arrows in Fig. 4, while the pressure is in the opposite direction on the heads 6. The forces thus acting on opposite sides of each half of the disk constitute a couple tending to turn the disk on a horizontal axis disposed at right angles to the axis of rotation of the engine, as shown in Fig. 4. This would tend to produce excessive friction between the disk and the walls of a counterpressure chamber about to be described, where the disk has contact with the latter. For overcoming this, a means is provided for opposing this couple of forces so that lateral pressure will be $nil$, and the disk will rotate freely in its normal plane without undue friction.

The casing A is provided with an annular peripheral counterpressure chamber 92 that opens into the casing and is disposed in the same plane with the disk. This chamber is formed by flanges 93 cast on the two sections of the casing and having their meeting walls recessed to form the chamber, the flanges being provided with peripheral ribs 94 through which pass bolts 95 for securing the two sections of the casing together. The peripheral or marginal portion of the disk rotates in this counterpressure chamber 92. The marginal portion of the disk is constructed on opposite sides with two concentric ribs 96 and 97, as clearly shown in Figs. 4, 6 and 13. The ribs 97 are so located as to be disposed within the casing, while the portion of the disk extending outwardly from the ribs 97 is disposed within the annular counterpressure chamber. Between the ribs 96 and 97 are circular grooves 98 and 99 disposed immediately adjacent the respective ribs and these grooves are connected with radial grooves 100 that are arranged in line with the blades. The segmental portions 101 at opposite sides of the disk and bounded by the grooves 98, 99 and 100, are countersunk with respect to the side faces of the ribs 96 and 97. On opposite sides of the disk are packings, a portion of one of the same being shown in Fig. 14. This packing comprises concentric rings 102 and 103 connected by radial spokes 104 so as to form a unitary structure, and these packings are carried by opposite sides of the peripheral portion of the disk, the rings 102 and 103 setting in the grooves 98 and 99, respectively, and the spokes 104 in the grooves 100. These rings project outwardly beyond the ribs or flanges 96 and 97 and bear against the side walls of the counterpressure chamber, so that a plurality of shallow segmental compartments are arranged on opposite sides of the marginal portion of the disk. There are as many of these shallow compartments in the counterpressure chamber as there are live and dead steam compartments between the blades, and live steam is admitted to this compartment in such a manner as to exert a pressure on the blade-driven disk opposing that exerted by the active steam in the blade compartments.

The packings in the counter-pressure chamber are held in engagement with the walls of the latter by springs 105 seated in transverse openings 106 in the bottoms of the connecting grooves 100 so that the ends of the spring will engage the corresponding spokes 104 of both packings. The disk 9 is provided with two sets of cross passages 107 and 108 which are so arranged that each set of passages will connect the blade compartments on one side of the disk with the counterpressure compartments on the opposite side of the disk. The area of each counterpressure compartment is so proportioned to the area of the blade compartment to which it is connected, that the pressure of the steam in these compartments, acting on the disk, will be balanced. As each blade compartment has active steam therein during one half revolution, the steam in the connected counterpressure compartment will also be active during the same part of the revolution, and during the last idle half of the revolution, when the exhaust takes place, the steam from the counterpressure chamber escapes through the cross passages by which it entered. It will thus be seen that at every point where live steam is acting to rotate the blades, the incidental lateral pressure on the disk is opposed by the steam acting in the counterpressure chamber. The water of condensation that might collect in the counterpressure compartments will tend to remain therein owing to the centrifugal force acting on the water as it is carried around by the disk. To provide an escape for this water, a drainage conduit 109 is arranged in one wall of the counterpressure chamber, as shown in Fig. 15, the receiving end of said conduit being so disposed as to communicate with the counterpressure compartments on one side of the disk as the latter rotates, while the outlet end of the conduit opens into those blade chambers that are connected with the exhaust. The water of condensation will thus be drawn out through the conduits 109, especially when the engine is connected with the condenser. A drainage conduit 109 is arranged at diametrically opposite sides of the engine, one for each set of compartments of the counterpressure chamber.

When wet steam at low temperature is used it may be desirable to have a counterpressure chamber filled with water of condensation as the loss by condensation caused by the presence of moisture in said chamber would sometimes be less than the waste of steam by filling the chamber with and exhausting it of wet steam. For this purpose a valve 110, Fig. 15, is arranged to close each drainage conduit. In case superheated steam is used, it may be desirable to prevent condensation in the counterpressure chamber by keeping the walls of the latter hot through the introduction of steam in jacket spaces 111 arranged in the flanges 93, Fig. 15.

Although the tendency of the disk is to wear equally on both sides, it might happen sometimes to wear more on one side than the other, and in order to determine whether this condition exists, a plurality of indicating devices 112 are arranged on the counterpressure chamber at 120 degrees apart. In the peripheral face of the disk, a central groove 113 is accurately cut for use in connection with these indicating devices. Each indicating device, as shown in Fig. 15, comprises a depressible pin 114 disposed radially in the outer wall of the counterpressure chamber so that when the disk is in central position, the pin can be depressed to engage its inner end in the peripheral groove 113. The pin is preferably made in two longitudinally divisible sections, so arranged that it can be determined which side the disk is out of true. For instance, if the wheel is inclined to the right, Fig. 15, the left section of the pin cannot be depressed into the groove 113, while the right section of the pin can be depressed. The position of the wheel will thus be determined. The pin has a head 115 on its outer end, behind which is arranged a helical spring 116 that holds the pin outwardly against a stop bracket 117. The indicating device is thus always available and can be used while the engine is operating to ascertain the position of the disk. In connection with these indicating devices, adjustable devices 118 are employed for truing or centering the disk. As shown in Fig. 20, each disk centering device comprises a pair of slidable shoes 119 extending inwardly from opposite sides of the counterpressure chamber through openings 120 so as to engage the side faces of the outer peripheral ribs 96 on the disk. These shoes or guide members are constantly urged inwardly toward each other so as to take up wear between them and the disk, but are prevented from moving outwardly, so that when once adjusted, they will hold the disk in central position unless the latter wears more on one side than the other.

The members 119 have upwardly-extending arms or brackets 121 terminating in internally threaded sleeves 122, through which passes a rod 123 that has right and left-hand threads engaging, respectively, in the sleeves

122 of the shoes. Thus, by turning the screw in one direction, the shoes will be moved inwardly toward the disk. This turning may be effected by a device 124 similar to the spring device 22, Fig. 4, for tightening the bearing blocks 19 which support the disk. It may be desirable to move both shoes together in one direction or the other for placing the disk in its true or central position. For this purpose, an adjusting nut 125 is arranged on the rod 123 between the shoulders 126 and 127, and this nut screws into an opening 128 in one of the ribs 94 of the counterpressure chamber. Thus, by turning the nut in one direction or the other, the rod 123 will be moved longitudinally and carry the disk-engaging shoes or devices with it. The shoulder 127 is formed by a sleeve 129 on which the right hand threads are cut, and this sleeve is held rigid on the rod 123 by a jam nut 130. One end of the rod is squared at 131 so as to be held by a wrench, while the nut 125 is turned.

Since the inner ribs 97 on the disk, Figs. 4 and 13, are disposed within the casing, they are cut away at points in line with the blade-receiving slots of the disk so that the blades can ride back and forth therethrough while maintaining contact with the bore of the casing. The packing strips of the blades will thus ride on the inner rings 103 of the packings in the counterpressure chamber and in the outer ends of the blade-receiving slots. The heads 6 have their inner faces provided with an annular recess 131ª, Fig. 4, at the peripheral edges so as to provide grooves immediately adjacent the casing for accommodating the inner ribs 97. By thus recessing the heads, the area of contact between the periphery thereof with the casing is reduced so that leakage of fluid is more apt to occur, and to prevent this leakage, packing rings 132 are inserted between the heads and casing. These rings are wedge-shaped in cross section and are pressed inwardly by springs 134, as clearly shown in Fig. 4. By removing the end plates 16, the packings can be taken out and renewed when required.

It is customary in rotary engine practice to employ two rotatable elements or rotors mounted upon the same shaft in order that one may balance the other, and the same practice may be followed in connection with the structure hereinbefore described.

From the foregoing description, taken in connection with the accompanying drawings, the advantages of the construction and of the method of operation will be readily apparent to those skilled in the art to which the invention appertains, and while we have described the principle of operation of the invention, together with the apparatus which we now consider to be the best embodiment thereof, we desire to have it understood that the apparatus shown is merely illustrative, and that such changes may be made when desired as are within the scope of the claims appended hereto.

Having thus described the invention, what we claim as new, and desire to secure by Letters Patent, is:

1. In a rotary engine, the combination of a casing, a rotatable disk disposed in the casing obliquely to the axis of rotation, a plurality of spaced blades mounted with respect to the disk for relative lateral movement therethrough and coöperating with the disk to provide separate sets of compartments at opposite sides of the disk which increase from minimum to maximum size during different portions of a revolution, means for supplying motive fluid to the compartments at successive points in the revolution of each compartment, and means for rendering the supply means active during the initial part of or throughout the range of the increase of the compartments from minimum to maximum size.

2. In a rotary engine, the combination of a casing, a plurality of radially disposed blades mounted for rotation in the casing, a blade driven disk mounted obliquely to the axis of rotation and through which the blades have lateral movement, said blades and disk coöperating to form sets of live steam compartments on opposite sides of the disk at diagonally opposite points and sets of dead steam compartments on opposite sides of the disk at other diagonally opposite points, means for simultaneously supplying motive fluid to the first set of compartments, said means being distributed to different points in the path of increase of the compartments from minimum to maximum size, and means for supplying motive fluid through any predetermined ones of the distributed supply means on the increase of the compartments from minimum to maximum size.

3. In a rotary engine, the combination of a casing, a plurality of rotatable blades disposed in radial relation thereto, a disk mounted to rotate on an axis coincident with the blades and disposed in a plane oblique to the axis of rotation, said blades being movable laterally through the disk and coöperating with the latter to provide separate sets of expanding and contracting compartments, fluid supply ports spaced around the casing and corresponding in number to the expanding compartments, exhaust ports spaced around the casing and corresponding in number to the contracting compartments, and means for controlling the admission of fluid through the first named ports to enter the successive compartments during the initial part of or throughout the range of their increase from minimum to maximum size, and for the exhaust of fluid from the second named ports.

4. In a rotary engine, the combination of a casing, a plurality of radial blades mounted for rotation therein, a disk mounted obliquely to the axis of rotation and through which the blades move laterally, said blades and disk coöperating to form compartments at each side of the disk successively increasing from minimum to maximum size during one-half the revolution and decreasing from the maximum to minimum size during the successive half revolution, conduits equal in number to the compartments and connected with the casing at spaced points for communication with said compartments, and a common valve controlling the passage of fluid through the conduits and constructed to admit fluid to those compartments increasing in size on both sides of the disk during a part, or throughout the period of increase in size and for connecting the compartments of decreasing size with the exhaust.

5. In a rotary engine, the combination of a blade-driven disk disposed obliquely to the axis of rotation, blade compartments at opposite sides of the disk, a counterpressure chamber extending around the casing in which the marginal portion of the disk moves, means for dividing the chamber at opposite sides of the disk into the same number of compartments as there are blade compartments, means for admitting fluid from the blade compartments at one side of the disk to the counterpressure compartments at the opposite side of the disk, and means for draining the water of condensation from the counterpressure compartments.

6. In a rotary engine, the combination of a casing, a plurality of radially-disposed blades rotatably mounted therein, an obliquely arranged partition disk driven by the blades, a counterpressure chamber extending around the casing and in which the peripheral portion of the disk rotates, devices on opposite sides of the disk and rotatable therewith for forming a plurality of counterpressure compartments of constant area, there being one counterpressure compartment for each blade compartment, and means of communication between each blade compartment and its respective counterpressure compartment.

7. In a rotary engine, the combination of a casing, a plurality of blades therein, a partition disk disposed obliquely to the axis of rotation and coöperating with the blades for forming a plurality of compartments, an annular chamber extending around the periphery of the casing and in which the peripheral portion of the disk rotates, said chamber having flat opposed walls, packings carried by opposite sides of the disk and engaging the flat walls of the chamber, said packings being provided with a plurality of counterpressure compartments, and means for admitting fluid under pressure to those compartments that are opposite the blade compartments that contain fluid under pressure for opposing the lateral pressure exerted by such fluid on the disk.

8. In a rotary engine, the combination of a casing, a plurality of blades therein, a partition disk disposed obliquely to the axis of rotation and coöperating with the blades for forming a plurality of compartments, an annular chamber extending around the periphery of the casing and in which the peripheral portion of the disk rotates, said chamber having flat opposed walls, packings carried by opposite sides of the disk and engaging the flat walls of the chamber, said packings being provided with a plurality of counterpressure compartments, means for admitting fluid under pressure to those compartments that are opposite the blade compartments that contain fluid under pressure for opposing the lateral pressure exerted by such fluid on the disk, and means carried by the disk for holding both packings against the walls of said chamber.

9. In an engine, the combination of a casing, a peripheral chamber extending around the same and disposed obliquely to the axis of the casing, a partition disk mounted in the casing for rotation with its peripheral portion disposed in the chamber, blades in the casing movable laterally through the partition disk for driving the latter, annular packings disposed in the chamber at opposite sides of the disk and rotatable therewith, each packing having as many fluid-tight compartments as there are compartments between the blades, and means carried by the disk for admitting fluid under pressure to the packing compartments disposed on opposite sides of the disk from the blade compartments containing fluid under pressure.

10. In a rotary engine, the combination of a casing, an annular chamber extending around the same and disposed in a plane obliquely to the axis of rotation, a disk mounted in the casing with its peripheral portion rotating in the chamber, blades in the casing for driving the disk, the opposite sides of the disk at its peripheral portion being provided with spaced annular grooves connected by radial grooves, packing rings mounted on each side of the disk and seated in the grooves, means for urging the packings outwardly into engagement with the opposed walls of the said chamber, the packing rings being provided with counterpressure compartments each connected with a compartment between the blades for admitting fluid under pressure in the counterpressure compartments to oppose the lateral pressure on the disk from the fluid in the blade compartments.

11. In a rotary engine, the combination of a casing, an annular counterpressure chamber extending around the casing, a disk mounted in the casing with its peripheral portion rotatable in the chamber, blades in the casing for driving the disk and coöperating therewith for forming blade compartments, said peripheral portion of the disk being provided on opposite sides with concentric grooves connected with radial grooves, the radial grooves being disposed in alinement with the blades, packings arranged at opposite sides of the disk and each consisting of concentric rings connected by radial ribs for seating in the grooves of the disk, and means for acting on both packings for urging the same outwardly into engagement with the walls of the chamber, said packings forming counterpressure compartments for the respective blade compartments, and means for admitting fluid under pressure to the counterpressure compartments to oppose the lateral pressure on the disk from the active motive fluid in the blade compartments.

12. In a rotary engine, the combination of a casing, an annular chamber extending around the same, a blade driven disk disposed in the casing with its peripheral portion rotating in the chamber, concentric ribs extending from opposite sides of the peripheral portion of the disk, means for dividing the space between the ribs into counterpressure compartments, and means for admitting and exhausting fluid to and from the counterpressure compartments in such manner as to counterbalance the pressure of the motive fluid in the casing acting on the disk.

13. In a rotary engine, the combination of a casing, a chamber extending around the same and opening into the casing, a blade-driven partition disk mounted in the casing with its peripheral portion rotatable in the chamber, laterally-movable packings on opposite sides of and carried by the disk for coöperating with the opposed walls of the chamber for forming counterpressure compartments, means for admitting fluid to and from the compartments for opposing the pressure of the motive fluid in the casing acting on the disk, and a plurality of devices spaced around the packings for urging the latter outwardly into contact with the walls of the chamber.

14. In a rotary engine, the combination of a casing, an annular chamber extending around the same, an obliquely arranged rotary disk in the casing having its peripheral portion rotatable in the chamber, packings disposed in the chamber at opposite sides of the disk, means on the disk for holding the packings in concentric relation to the latter, separate means for preventing independent rotation of the packings on the disk, means for urging the packings into engagement with the walls of the chamber to form a plurality of independent counterpressure compartments at opposite sides of the disk, means for admitting fluid under pressure to the compartments at such points in the rotation of the disk as to counterbalance the lateral pressure on the disk from the motive fluid in the casing, and means for exhausting the fluid from the counterpressure compartments at those points where the motive fluid is exhausted from the casing.

15. In a rotary engine, the combination of a casing, an annular chamber extending around the same, a blade-driven disk mounted in the casing with its peripheral portion disposed in the chamber, means for dividing the space in the chamber at opposite sides of the disk into counterpressure compartments, means for admitting fluid under pressure to the compartments for opposing the lateral pressure of the motive fluid in the casing on the disk, and a controllable means for the counterpressure compartments of each side of the disk for draining the water of condensation therefrom.

16. In a rotary engine, the combination of a casing, an annular chamber extending around the same, a blade-driven disk mounted in the casing with its peripheral portion disposed in the chamber, means for dividing the space in the chamber at opposite sides of the disk into counterpressure compartments, means for admitting fluid under pressure to the compartments for opposing the lateral pressure of the motive fluid in the casing on the disk, and heating means in the walls of the chamber in operative relation to the counterpressure compartments to counteract the tendency of the motive fluid to condense.

17. In a rotary engine, the combination of a casing, an obliquely arranged blade-driven disk mounted in the casing, and means on the casing for ascertaining the position of the disk.

18. In a rotary engine, the combination of a casing, an obliquely arranged blade-driven disk mounted in the casing, said disk having spaced walls in its periphery, and an indicating device coöperating with the said walls for determining the position of the disk.

19. In a rotary engine, the combination of a casing, an obliquely arranged blade-driven disk mounted in the casing, said disk having spaced walls in its periphery, and an indicating device coöperating with the said walls for determining the position of the disk, said device comprising a member movable into the casing for engaging between the walls to determine the position of the disk.

20. In a rotary engine, the combination of a casing, an obliquely arranged blade-driven disk mounted in the casing, said disk having spaced walls in its periphery, an indicating device coöperating with the said walls for determining the position of the disk, said device comprising a member extending through the wall of the casing and movable inwardly to engage between the walls, and means for normally holding the member out of engagement with the walls.

21. In a rotary engine, the combination of a casing, an obliquely arranged blade-driven disk mounted in the casing, said disk having spaced walls in its periphery, and an indicating device coöperating with the said walls for determining the position of the disk, said device comprising a radially-disposed member extending through the wall of the casing and divided longitudinally into two parts to be independently or simultaneously depressible inwardly between the walls for determining the position of the disk.

22. In a rotary engine, the combination of a casing, an obliquely arranged blade-driven disk mounted in the casing, said disk having spaced walls in its periphery, an indicating device coöperating with the said walls for determining the position of the disk, said device comprising a radially-disposed member extending through the wall of the casing and divided longitudinally into two parts to be independently or simultaneously depressible inwardly between the walls for determining the position of the disk, and means acting on the member for normally holding the same out of engagement with the disk.

23. In a rotary engine, the combination of a casing, an obliquely arranged blade-driven disk mounted therein, a plurality of indicating devices permanently mounted on the casing for determining the position of the disk at different points around the periphery thereof, and a disk-adjusting means mounted on the casing adjacent each device.

24. In a rotary engine, the combination of a casing, a blade-driven disk mounted therein obliquely to the axis of rotation, and a plurality of disk-centering devices disposed around the casing for engaging the periphery of the disk, each device comprising wearing members or shoes urged constantly into engagement with opposite sides of the disk.

25. In a rotary engine, the combination of a casing, a blade-driven disk mounted therein obliquely to the axis of rotation, a plurality of disk-centering devices disposed around the casing for engaging the periphery of the disk, each device comprising wearing members or shoes urged constantly into engagement with opposite sides of the disk, and means for simultaneously moving the members in one direction or the other for centering the disk.

26. In a rotary engine, the combination of a casing, a blade-driven disk mounted therein, means for centering the disk, said means comprising a pair of oppositely-disposed members engaging the sides of the disk at its periphery, and a rotary member having reversely-threaded portions engaging the first named members for moving the same simultaneously.

27. In a rotary engine, the combination of a casing, a blade-driven disk mounted therein, means for centering the disk, said means comprising a pair of oppositely-disposed members engaging the sides of the disk at its periphery, a rotary member having reversely-threaded portions engaging the first named members for moving the same simultaneously, and means tending constantly to turn the rotary member for moving the first named members toward the disk to compensate for wear.

28. In a rotary engine, the combination of a casing, a blade-driven disk mounted therein, means for centering the disk, said means comprising a pair of oppositely-disposed members engaging the sides of the disk at its periphery, a rotary member having reversely-threaded portions engaging the first named members for moving the same simultaneously, means tending constantly to turn the rotary member for moving the first named members toward the disk to compensate for wear, and means for moving the rotary member longitudinally in either direction for centralizing the disk.

29. In a rotary engine, the combination of a casing, blades therein, a partition disk mounted in the casing and having slots through which the blades move, chambers in the disk at the slots, packing in the chambers, fluid passages connecting the packing chambers with the spaces at opposite sides of the disk, and valves for opening communication between the chambers and the high pressure side of the disk and cutting off communication between the chambers and the low pressure side of the disk for holding the packings in engagement with the blades by fluid pressure.

30. In a rotary engine, the combination of a casing, blades therein, a partition disk having slots through which the blades move, packing chambers in the disk at the slots thereof, a plurality of packing strips in each chamber, passages leading from each chamber to opposite sides of the disk, and a controlling valve for each chamber operated by fluid pressure for closing one passage and simultaneously opening the other to admit fluid from the high pressure side of the disk to the packing chamber for urging the packing strips into engagement with the blades.

31. In a rotary engine, the combination of a casing, blades therein, a partition disk having slots through which the blades move, packing chambers in the disk at the slots thereof, a plurality of packing strips in each chamber, passages leading from each chamber to opposite sides of the disk, a controlling valve for each chamber operated by fluid pressure for closing one passage and simultaneously opening the other to admit fluid from the high pressure side of the disk to the packing chamber for urging the packing strips into engagement with the blades, and means in each chamber for taking up the wear of the packing strips.

32. In a rotary engine, the combination of a casing, blades therein, a partition disk having slots through which the blades move, packing chambers in the disk at the slots thereof, a plurality of packing strips in each chamber, passages leading from each chamber to opposite sides of the disk, a controlling valve for each chamber operated by fluid pressure for closing one passage and simultaneously opening the other to admit fluid from the high pressure side of the disk to the packing chamber for urging the packing strips into engagement with the blades, a wear strip in each chamber for taking up the wear of the packing strips, and means constantly acting on the wear strip to urge the same in a direction to take up the wear.

33. In a rotary engine, the combination of a casing, a rotary blade therein, a disk driven by the blade and having a slot through which the latter moves laterally, chambers in the disk at the sides of the slot, packings in the chambers yieldable to pressure within the chambers to move into engagement with the blade, and oppositely-disposed devices in each chamber engaging opposite sides of the packing therein for compensating for wear.

34. In a rotary engine, the combination of a casing, a rotary blade therein, a disk having a slot through which the blade moves laterally, packings at the opposite sides of the slots for engaging the blade, a driving pin carried by the disk to engage the blade and through which the latter drives the disk, and means for adjusting the pin to take up wear.

35. In a rotary engine, the combination of a casing, a rotary blade having concave opposite faces, a partition disk arranged obliquely to the axis of rotation of the blade and having a slot through which the latter moves laterally, yielding packings in opposite sides of the slot for engaging the concave faces of the blade, a concave packing in the end of the blade engaging the end of the slot in the disk, and means for providing a driving engagement between the blade and disk independently of the packings.

36. In a rotary engine, the combination of a casing, a rotary blade having concave opposite faces, a partition disk arranged obliquely to the axis of rotation of the blade and having a slot through which the latter moves laterally, yielding packings in opposite sides of the slot for engaging the concave faces of the blade, a hub for the disk having a slot in alinement with the slot in the disk, a block movable in the slot in the hub, and a pin carried by said block and fitting in the end of the blade to form a driving engagement between the blade and the disk.

37. In a rotary engine, the combination of a casing, a rotary blade having concave opposite faces, a partition disk arranged obliquely to the axis of rotation of the blade and having a slot through which the latter moves laterally, yielding packings in opposite sides of the slot for engaging the concave faces of the blade, a hub for the disk, a block mounted movably on the hub, a pin carried by said block and engaging the end of the blade to form a driving connection between the same and the disk, and means for adjusting the blocks to compensate for wear.

38. In a rotary engine, the combination of a casing, a blade therein, a disk mounted in the casing obliquely to the axis of rotation, a central spherical bearing rigid on the disk, and supporting devices disposed at opposite sides of the disk and urged continuously against the said bearing for sustaining the weight of the disk.

39. In a rotary engine, the combination of a casing, blades therein, a blade-driven disk arranged obliquely to the axis of rotation of the blades, a central spherical bearing, cupped bearing blocks engaging opposite sides of the bearing and mounted for rotation therewith, and means for constantly urging the blocks toward the bearing.

40. In a rotary engine, the combination of a casing, blades therein, a blade-driven disk arranged obliquely to the axis of rotation of the blades, a central spherical bearing, cupped bearing blocks engaging opposite sides of the bearing and mounted for rotation therewith, wedges behind the blocks, and means for moving the wedges to adjust the blocks toward the bearing.

41. In a rotary engine, the combination of a casing, blades therein, a blade-driven disk arranged obliquely to the axis of rotation of the blades, a central spherical bearing, cupped bearing blocks engaging opposite sides of the bearing and mounted for rotation therewith, wedges behind the blocks, screws for adjusting the wedges, and means tending constantly to turn the screws in the direction for actuating the wedges.

42. In a rotary engine, the combination of a casing, a plurality of blades therein, oppositely-disposed conical heads secured to the blades, a disk mounted in the casing obliquely to the axis of rotation and through which the blades move laterally, a central spherical bearing on the disk, bearing blocks set into the points of the conical heads and engaging opposite sides of the spherical bearing to sustain the weight of the disk, and wedging devices carried by the heads for constantly urging the blocks toward the bearing.

43. In a rotary engine, the combination of a casing, rotary blades therein, oppositely-disposed conical heads secured to the blades and fitted in the casing, a blade-driven partition disk mounted in the casing obliquely to the axis of rotation and through which the blades move laterally, packings arranged to wedge between the heads and casing, and means for pressing the packings in engagement with the heads and casing.

44. In a rotary engine, the combination of a casing, a plurality of radial blades mounted therein for rotation, an obliquely disposed partition disk in the casing coöperating with the blades for forming separate blade compartments on opposite sides of the disk, ports in the casing for the various compartments, and conduits connecting each pair of ports that communicates with corresponding compartments on opposite sides of the disk, portions of the conduits being formed integral with the casing and other portions being spaced from the casing.

45. In a rotary engine, the combination of a casing, a disk therein, a blade movable through the disk, a hollow hub for the disk having a slot in alinement with the blade, a plate within the disk covering said slot, a block on said plate mounted to slide in said slot but held against rotation therein, a pin projecting from said block to engage the end of the blade, and means for holding the plate toward the wall of the hub.

46. In a rotary engine, the combination of a casing, a disk therein, a blade movable through the disk, a hollow hub for the disk having a slot in alinement with the blade, a plate within the hub covering said slot in all positions of the hub and disk, a bushing within said slot fitting against said plate and the end of the blade, a block on the plate engaging the inner walls of the bushing, a pin projecting from the block to engage the end of the blade, and means for holding the plate against the bushing.

In testimony that we claim the foregoing as our own, we have hereto affixed our signatures in the presence of two witnesses.

EDWIN ERICKSON,
THEODORE ERICKSON.

Witnesses for Edwin Erickson:
  JOHN FALKERTS,
  ALBUR ERICKSON.
Witnesses for Theodore Erickson:
  JOHN ERICKSON,
  EMIEL CARLSON.

---

Copies of this patent may be obtained for five cents each, by addressing the "Commissioner of Patents, Washington, D. C."